United States Patent
Gelbmann et al.

(10) Patent No.: US 9,656,919 B2
(45) Date of Patent: May 23, 2017

(54) FIRE-RESISTANT CERAMIC MIX AND FIRE RESISTANT CERAMIC PRODUCT

(71) Applicant: REFRACTORY INTELLECTUAL PROPERTY GMBH & CO. KG, Vienna (AT)

(72) Inventors: Gerald Gelbmann, Leoben (AT); Friedrich Kahr, Veitsch (AT)

(73) Assignee: Refractory Intellectual Property GMBH & Co. KG, Vienna (AT)

( * ) Notice: Subject to any disclaimer, the term of this patent is extended or adjusted under 35 U.S.C. 154(b) by 0 days.

(21) Appl. No.: 14/778,472

(22) PCT Filed: Jan. 20, 2014

(86) PCT No.: PCT/EP2014/050992
§ 371 (c)(1),
(2) Date: Sep. 18, 2015

(87) PCT Pub. No.: WO2014/146807
PCT Pub. Date: Sep. 25, 2014

(65) Prior Publication Data
US 2016/0280603 A1    Sep. 29, 2016

(30) Foreign Application Priority Data
Mar. 22, 2013    (EP) .................................... 13160571

(51) Int. Cl.
*C04B 35/03* (2006.01)
*C04B 35/04* (2006.01)
(Continued)

(52) U.S. Cl.
CPC ............ *C04B 35/04* (2013.01); *C04B 35/043* (2013.01); *C04B 35/66* (2013.01); *C04B 2235/3206* (2013.01); *C04B 2235/3208* (2013.01); *C04B 2235/3212* (2013.01); *C04B 2235/3217* (2013.01); *C04B 2235/3222* (2013.01); *C04B 2235/3272* (2013.01); *C04B 2235/3274* (2013.01); *C04B 2235/34* (2013.01); *C04B 2235/3418* (2013.01); *C04B 2235/3454* (2013.01); *C04B 2235/447* (2013.01); *C04B 2235/5472* (2013.01); *C04B 2235/80* (2013.01)

(58) Field of Classification Search
CPC ... C04B 35/04; C04B 35/043; C04B 35/0435; C04B 35/05; C04B 35/053
USPC .................................................. 501/108, 111
See application file for complete search history.

(56) References Cited

U.S. PATENT DOCUMENTS

| 3,427,174 | A | * | 2/1969 | Miller | ..................... | C04B 28/34 |
|---|---|---|---|---|---|---|
| | | | | | | 264/649 |
| 4,175,974 | A | * | 11/1979 | Grabner | ................. | B22D 41/32 |
| | | | | | | 222/600 |
| 6,482,760 | B1 | * | 11/2002 | Buchebner | ............ | C04B 35/043 |
| | | | | | | 501/112 |

FOREIGN PATENT DOCUMENTS

| AT | DE 19859372 C1 * | 6/2000 | ........... C04B 35/043 |
|---|---|---|---|
| EP | 0015638 A1 | 9/1980 | |

(Continued)

OTHER PUBLICATIONS

International Search Report for App. No. PCT/EP2014/050992 mailed Mar. 7, 2014.

(Continued)

*Primary Examiner* — Noah Wiese
(74) *Attorney, Agent, or Firm* — Walker & Jocke (57) ABSTRACT

The invention concerns a refractory ceramic batch as well as a refractory ceramic product.

20 Claims, 5 Drawing Sheets

(51) Int. Cl.
*C04B 35/043* (2006.01)
*C04B 35/66* (2006.01)

(56) References Cited

FOREIGN PATENT DOCUMENTS

| | | |
|---|---|---|
| EP | 0248171 A1 | 12/1987 |
| EP | 0351084 A2 | 1/1990 |
| GB | 871965 A | 7/1961 |
| GB | 1118073 A | 6/1968 |
| GB | 1503278 A | 3/1978 |
| GB | 2286184 A | 8/1995 |

OTHER PUBLICATIONS

Claude Allaire, et al: "Basic Phosphate-Based Castable from Dolomitic-Magnesite Clinkers", J. Am. Cer. Soc., vol. 72, No. 9, Sep. 1989, pp. 1699-1703, XP002698454, Canada.

\* cited by examiner

FIRE-RESISTANT CERAMIC MIX AND FIRE RESISTANT CERAMIC PRODUCT

The invention relates to a refractory ceramic batch as well as to a refractory ceramic product.

Refractory ceramic products can be divided into various categories, for example into basic and non-basic products. The invention only relates to basic products, and in fact to a batch and to a product produced therefrom, the basic base material of which consists of magnesia.

Batches for the production of basic ceramic refractory products are known from DE 44 03 869 C2 and from DE 198 59 372 C1. In addition to the basic base material, the known products consist of spinets (hercynite, galaxite, jacobsite).

"Refractory ceramic batch" is used to describe a composition formed from one or more components which can be used to produce a refractory ceramic product by means of ceramic firing. In particular, the term "refractory ceramic product" within the context of the invention describes ceramic products with a service temperature of more than 600° C., preferably refractory substances in accordance with DIN 5106, i.e. substances with a pyrometric cone equivalent of more than SK 17.

Shaped refractory ceramic products are known in the form of refractory bricks, for example.

Refractory bricks are used in a very wide variety of equipment, in particular in thermal processing equipment in the metal, glass or cement industry, for example.

In the cement industry, refractory bricks are used, for example as so-called rotary cement kiln bricks for the linings of rotary cement kilns. Rotary cement kiln bricks are produced in part from iron- and lime-rich sintered magnesia, which is known as "sinter 6". Because rotary cement kiln bricks are exposed to high mechanical loads when installed in a rotary cement kiln, they require so-called plasticizers which are usually selected from the spinel group, i.e. in particular, for example, spinel (true spinel, magnesia-alumina spinel), hercynite (ferro-spinel) or galaxite (manganspinel). Since the interaction of these raw materials in the rotary cement kiln brick results in relatively low refractoriness, for example with a refractoriness under load temperature, $T_0$, of less than 1,400° C., the alumina ($Al_2O_3$) content in the rotary cement kiln brick should be kept as low as possible. This is achieved by using hercynite, for example. Using hercynite has the advantage that even with an addition of 5% of hercynite to the brick, the alumina content in the product can be kept to a relatively low level.

A further advantage of using hercynite is that, by simultaneously using hercynite and spinel in particular, a brick produced therefrom may also have outstanding corrosion resistance, for example good resistance of the brick to sulphate corrosion.

Higher hercynite and spinel contents would be of great practical advantage. However, refractory ceramic bricks, which have a relatively high iron oxide ($Fe_2O_3$) content because of their raw materials, only comprise maximum hercynite contents of about 5% when they are to be used in mechanically heavily loaded regions. Higher proportions of hercynite would reduce the refractoriness under load temperature of these bricks by too much, whereupon the refractory properties of these bricks would not be sufficient for use in mechanically heavily stressed regions.

The refractoriness under load value $T_0$ defines the invariant point for the phase system of the phases present in the refractory brick, i.e. the temperature in the respective phase system of the bricks at which the first molten phases appear, and thus the refractoriness of the bricks falls abruptly. With refractory bricks based on magnesia with hercynite and spinel as further components, the particular phases of magnesia, spinel, hercynite and dicalcium silicate are present in the brick; in particular, the CaO and $SiO_2$ of the dicalcium silicate are introduced into the batch via natural impurities or minor constituents of the magnesia and thus into the bricks produced therefrom. Furthermore, ferrite may be present in the refractory brick as a further phase; the iron in the ferrite may also in particular be introduced into the batch via iron-containing impurities in the magnesia and thus into the bricks produced therefrom; the term "ferrite" as used herein also describes ferritic solid solutions as well as ferrite.

The invariant point of the magnesia-spinel-dicalcium silicate system is 1,417° C.

Since CaO cannot be completely neutralized with $SiO_2$, calcium aluminate is also present in the brick as a further phase. The invariant point in the magnesia-spinel-dicalcium silicate-calcium aluminate phase system which is then present is only 1,325° C.

In order to obtain an invariant point in a brick formed from the components magnesia, spinel and hercynite which is as close as possible to the temperature of 1,417° C., it is known in the art to alter the chemical composition of the batch as regards the proportion of $SiO_2$ by specifically adding $SiO_2$ such that the proportion of CaO in the batch is completely neutralized by $SiO_2$, and CaO and $SiO_2$ react together as completely as possible to form dicalcium silicate during ceramic firing. Complete neutralization of the CaO by $SiO_2$ is then in particular possible if the mole fraction of CaO in the batch is twice the mole fraction of $SiO_2$.

Moreover, the invariant point of 1,417° C. in the magnesia-spinel-dicalcium silicate system can also be reduced by iron oxide. In a batch based on the components magnesia, spinel and hercynite, this iron oxide, which has a negative effect on the invariant point of the magnesia-spinel-dicalcium silicate system, in particular does not originate from the hercynite component, but from impurities or minor constituents of the magnesia component, since magnesia regularly comprises proportions of iron oxide ($Fe_2O_3$). As a rule, the iron oxide content of the hercynite component does not have a negative effect on the refractory properties, since iron oxide is stable in hercynite. As long as the proportion of iron oxide contributed to the batch or the refractory brick produced therefrom by the magnesia does not exceed 3%, then as a rule, this does not result in a substantial drop in the invariant point, since iron oxide is soluble in magnesia in proportions of up to approximately 3%. If, however, the proportion of iron oxide from the magnesia in the batch or in the brick produced therefrom exceeds an amount of 3%, this results in a noticeable drop in the invariant point of a refractory brick produced from such a batch. In particular, beyond a proportion of approximately 6% iron oxide, as a general rule, the invariant point drops substantially.

Even setting the molar ratio of CaO to $SiO_2$ in the batch at 2:1 cannot prevent such a drop in the invariant point because of the presence of iron oxide.

The object of the invention is to provide a refractory ceramic batch based on magnesia and at least one plasticizer, in particular at least one plasticizer from the spinel group, in which CaO is present in proportions which cannot be completely neutralized by the proportion of $SiO_2$ in the batch upon ceramic firing, whereupon ceramic firing of this batch can produce a refractory shaped ceramic product with improved refractory properties compared with prior art products of the same type, and also in particular when the batch has proportions of iron oxide which are not introduced via the plasticizer into the batch or the brick produced therefrom of more than 3%.

A further object of the invention is to provide a shaped refractory ceramic product which is produced from such a batch by means of ceramic firing.

The solution of the invention is to provide a refractory ceramic batch based on magnesia with the following characteristics:

the batch comprises the following components:
magnesia,
at least one plasticizer, as well as
at least one phosphorus-comprising component;
the batch comprises proportions of CaO (calcium oxide) and if appropriate $SiO_2$ (silicon dioxide) wherein the mole fraction of CaO in the batch is more than twice the mole fraction of $SiO_2$ in the batch.

The invention is based on the surprising discovery that the refractory properties of a shaped refractory product which is produced on the basis of a batch comprising magnesia and at least one plasticizer and in which the molar ratio of CaO to $SiO_2$ in the batch is more than 2 are influenced in a positive manner when the batch comprises phosphorus. Since the molar ratio of CaO to $SiO_2$ in the batch is more than 2, free CaO is present in the batch, i.e. CaO which is not neutralized by $SiO_2$ during ceramic firing of the batch and which reacts with it to form dicalcium silicate. This free CaO reacts during the ceramic firing of the batch with at least a portion of the phosphorus which has been introduced into the batch via the phosphorus-containing component. In particular, during ceramic firing of the batch, the phosphorus as well as the CaO react to form tricalcium phosphate; the remaining phosphorus, CaO and $SiO_2$ react to form a calcium-silicate-phosphate solid solution.

Surprisingly, moreover, in accordance with the invention, it has been shown that the presence of phosphorus in the batch, which is accompanied by the formation of the aforementioned phases during ceramic firing of the batch, means that the refractory properties of a refractory shaped product formed from the batch of the invention can be altered in an advantageous manner.

In particular, in this regard it has surprisingly been shown that the invariant point of the phase system of a ceramic product which is produced on the basis magnesia and at least one plasticizer as the components of the batch, and which does not comprise more than 3% of iron oxide introduced into the batch or the product produced therefrom by the at least one plasticizer, is higher when the batch additionally comprises phosphorus.

The basis for this effect cannot as yet be explained in detail. However, it has been shown that the system can be very sensitive to further components, i.e. components in addition to magnesia, plasticizer and at least one phosphorus-comprising component which are present in the batch, at least insofar as these are not present in the batch in insignificant quantities.

It has also surprisingly been shown that, because of the presence of the phosphorus-comprising component in the batch, a drop in the invariant point, in particular when the batch or the product produced therefrom does not comprise more than 3% of iron oxide not contributed by the at least one plasticizer, is not only avoided, but it can also be increased.

Preferably, the phosphorus-comprising component is present in proportions in the batch such that the phosphorus and the proportion of CaO in the batch which is not neutralized by $SiO_2$ can react together substantially or completely so that in the ceramic product which is produced by firing the batch of the invention, no or only a small proportion of CaO or phosphorus which have not reacted together or with the $SiO_2$ content are present.

In principle, phosphate can be introduced into the batch by any of the components, or it may be present in the batch in any form. In this regard, the phosphorus-comprising component may in principle be any phosphorus-comprising substance.

The at least one phosphorus-comprising component may be one, or various, components which comprise phosphorus. The phosphorus-comprising component may be elemental phosphorus. As an example, the phosphorus-comprising component may be one or more of the following components: phosphorus, oxide of phosphorus, phosphoric acid or phosphate. When the phosphorus-comprising component is present as an oxide of phosphorus, this may in particular be in the form of diphosphorous pentoxide ($P_2O_5$). When the phosphorus-comprising component is present as phosphoric acid, this may in particular be present in the form of orthophosphoric acid ($H_3PO_4$). If the phosphorus-comprising component is in the form of phosphate, this may in particular be present in the form of at least one of the following phosphates: sodium hexametaphosphate or aluminium metaphosphate.

The proportions of "phosphorus" in the batch of the invention or in the product produced therefrom as described herein are always given as proportions in the form of diphosphorous pentoxide ($P_2O_5$).

Finally, unless otherwise indicated in individual cases, percentages given herein are all given as a weight % with respect to the total weight of the batch of the invention or the total weight of the refractory product in accordance with the invention.

In accordance with the invention, the phosphorus-comprising component may be provided in the batch in proportions such that the proportion of phosphorus as well as the proportion of CaO in the fired product formed from the batch of the invention, i.e. after ceramic firing of the batch of the invention, which have not reacted together or with the $SiO_2$ fraction in the batch, in each case is preferably not above 0.5% including, for example, not above 0.4%, 0.3%, 0.2% or 0.1%.

In order to be able to determine the necessary quantity of phosphorus—i.e., in accordance with the nomenclature selected herein, the necessary quantity of diphosphorus pentoxide—in the batch of the invention which is necessary to completely bind the free CaO in the batch by phosphorus, i.e. in particular to react with it to form tricalcium phosphate or to form a calcium-silicate-phosphate solid solution together with the $SiO_2$, the ideal quantity of phosphorus in the batch which is necessary in this regard can be determined using the following formula:

$$P_2O_{5\,ideal}\ [\%] = (CaO_{free}) \cdot \frac{b}{a} \quad (I)$$

wherein $CaO_{free}$ is quantity of free CaO in the batch as a weight %, which can be determined using the following formula:

$$CaO_{free} = x - \frac{2 \cdot y \cdot c}{s} \quad (II)$$

with x=proportion of CaO in batch [%]
y=$SiO_2$ content in batch [%]
c=molecular weight of CaO [g/mol]=56 g/mol
s=molecular weight of $SiO_2$ [g/mol]=60.1 g/mol
a=fraction of CaO in tricalcium phosphate [%]=54.2%
b=fraction of $P_2O_5$ in tricalcium phosphate [%]=45.8%.

In one embodiment, the fraction by weight of phosphorus in the batch is at most 50% including, for example, at most 40%, 30%, 20% or 10% above or below the ideal value for the fraction by weight of phosphorus in the batch given by the above formula (I), wherein the percentages given above are each with respect to the ideal proportion of phosphorus in the batch given by formula (I).

The proportions of CaO and/or $SiO_2$ may in particular by introduced into the batch as minor constituents or impurities of the major components of the batch of the invention, i.e. magnesia, spinel and hercynite. In particular, magnesia regularly comprises CaO and $SiO_2$ as minor constituents or impurities, so that in particular, CaO and $SiO_2$ can be introduced into the batch of the invention by the magnesia component. In addition or alternatively, however, CaO and/or $SiO_2$ are not introduced into the batch of the invention as minor constituents or impurities of the major components but are introduced specifically into the batch of the invention, in particular by means of CaO or $SiO_2$-containing components. In this regard, CaO may, for example, be introduced into the batch using limestone and/or dolomite and $SiO_2$ may, for example, be introduced into the batch by means of quartz or silica.

In each case, the mole fraction of CaO in the batch is more than twice that of the mole fraction of $SiO_2$ in the batch. If there is no $SiO_2$ in the batch, then the mole fraction of CaO is infinitely higher than the mole fraction of $SiO_2$ in the batch.

In accordance with the invention, the fraction by weight of CaO, with respect to the total weight of the batch, may be in the range 0.2% to 8% by weight.

In this regard, for example, the fraction by weight of CaO in the batch may be at least 0.2%, 0.3%, 0.4%, 0.5%, 0.6%, 0.7% or 0.8%. Furthermore, for example, the fraction by weight of CaO in the batch may be at most 8%, 7%, 6%, 5%, 4%, 3%, 2.8%, 2.5%, 2.4%, 2.3%, 2.2%, 2.1% or 2.0%.

The fraction by weight of $SiO_2$ in the batch, with respect to the total weight of the batch, may be in the range 0.05% to 3% by weight.

In this regard, the fraction by weight of $SiO_2$ in the batch may, for example, be at least 0.05%, 0.07%, 0.1%, 0.15%, 0.2%, 0.25%, 0.3%, 0.35% or 0.4%. Furthermore, for example, the fraction by weight of $SiO_2$ in the batch may be at most 3%, 2%, 1.8%, 1.5%, 1.4%, 1.3%, 1.2%, 1.1% or 1.0%.

The ratio of the mole fractions of CaO to $SiO_2$ in the batch, in particular including, for example, the ratio of the mole fractions of CaO to $SiO_2$ in the magnesia component of the batch, insofar as CaO and $SiO_2$ have been introduced into the batch as minor constituents or impurities of the magnesia, may in particular be in the range from more than 2 to 10 including, for example, in the range more than 2 to 6. Because of this value for the mole fraction of CaO to $SiO_2$ and the absolute fractions by weight of CaO and $SiO_2$ in the batch, the fraction by weight of phosphorus in the batch, calculated as $P_2O_5$, may, for example, be at most 5% including, for example, at most 4%, 3%, 2%, 1.8%, 1.7%, 1.6%, 1.5%, 1.4%, 1.3%, 1.2%, 1.1% or 1%. As an example, the fraction by weight of phosphorus in the batch may, for example, also be at least 0.1% including, for example, at least 0.2%, 0.3%, 0.4% or 0.5%.

The phosphorus-comprising component may thus be present in the batch in fractions by weight such that phosphorus is present in the batch in the proportions given herein.

The fraction by weight of iron oxide in the batch, in particular the fraction by weight of $Fe_2O_3$, which is not in the form of or as a constituent of the iron-containing plasticizer in the batch—in particular, for example, in the form of an iron-containing plasticizer from the spinel group, for example as a constituent of hercynite or jacobsite—may preferably be over 3%, with respect to the total weight of the batch. In this regard, the fraction by weight of iron oxide in the batch which is not present in the form of an iron-containing plasticizer in the batch is, for example, also over 4%, 5%, 5.5%, 6%, 6.5% or 7%. As an example, the fraction by weight of iron oxide, again in particular in the form of $Fe_2O_3$ which is not in the form of an iron-containing plasticizer in the batch, is present in the batch in proportions of at most 15% including, for example, in proportions of at most 14%, 13%, 12%, 11%, 10%, 9%, 8.5% or 8%. Particularly preferably, the fraction by weight of iron oxide which is not in the form of an iron-containing plasticizer in the batch is present in the batch in proportions of between 3% and 10%.

The magnesia component may be present in the batch in the form of fused magnesia or sintered magnesia, preferably in the form of sintered magnesia.

As an example, the magnesia component may be present in the batch in fractions by weight in the range 70% to 97% including, for example, in proportions of at least 70%, 72%, 74%, 76%, 78%, 80%, 81%, 82%, 83%, 84% or 85%. As an example, the magnesia may be present in the batch in fractions by weight of at most 97% including, for example, in proportions of at most 95%, 93%, 92%, 91% or 90%.

Since magnesia regularly includes iron oxide, in particular $Fe_2O_3$, as a minor constituent or natural impurity, the magnesia component may in particular also be an iron oxide-comprising component, so that a proportion of iron oxide of the batch of the invention which is not introduced into the batch by the at least one plasticizer may in particular be introduced into the batch by means of the magnesia.

Because of the phenomenon described above, in a batch of the prior art, iron oxide proportions of more than 3% which are not present in the form of an iron-containing plasticizer, in particular an iron-containing plasticizer from the spinel group can reduce the invariant point of the phase system of a brick produced from the batch; thus, with prior art batches, care is taken to keep the proportion of iron oxide in the batch as low as possible, or to use magnesia with as little iron as possible. Since the invention has established that the presence of phosphorus in batches of this type can even increase the invariant point by the simultaneous presence in the batch of iron oxide which is not in the form of an iron-containing plasticizer, then in accordance with the invention, iron oxide-rich magnesia can specifically be introduced as a component, for example using magnesia with a fraction by weight of iron oxide in the range 3% to 15% by weight with respect to the weight of the magnesia. In this regard, for example, a magnesia with a fraction by weight of iron oxide respectively with respect to the weight of the magnesia of at least 3% including, for example, at least 3.5%, 4%, 4.5% or 5%, may be present in the batch of the invention. Furthermore, the fraction by weight of iron oxide in the magnesia, again with respect to the weight of the magnesia, may be at most 15% by weight including, for example, at most 13%, 12%, 11%, 10%, 9%, 8%, 7% or 6%.

In accordance with one embodiment, a plurality of different magnesias are provided in the batch as the magnesia components, in particular, for example, in order to obtain the aforementioned fractions by weight of iron oxide in the batch which are not present in the batch in the form of an iron-containing plasticizer; in total, the various magnesias may thus comprise the aforementioned proportions of iron oxide. The above information regarding the fractions by weight of magnesia in the batch, the proportions of iron oxide in the batch which are introduced into the batch by the magnesia, as well as the proportions of iron oxide in the magnesia, thus hold for the total weight of these various magnesias when using a plurality of different magnesias.

The magnesia in the batch of the invention may in particular also be the component via which CaO and $SiO_2$ are introduced into the batch, since magnesia regularly also comprises CaO and $SiO_2$ as minor constituents or impurities. In this regard, a magnesia may preferably be present in the batch the mole fraction of CaO to $SiO_2$ of which is more than 2. As an example, again, different magnesias with different proportions or ratios of CaO to $SiO_2$ may be present in the batch, so that in total, again, these have a mole fraction of CaO to $SiO_2$ of more than 2. The molar ratio of CaO to $SiO_2$ in the magnesia component of the batch is preferably more than 2 including, for example, more than 2.2, more than 2.4, more than 2.6, more than 2.8 or more than 3. The molar ratio of CaO to $SiO_2$ in the magnesia component may, for example, be at most 10 including, for example, at most 9, 8, 7, 6, 5 or at most 4. If a plurality of different magnesias are present in the batch, these values hold for the total weight of the various magnesias.

The fraction by weight of CaO in the magnesia may, for example, be at least 0.5% by weight, with respect to the total weight of magnesia including, for example, at least 1%, 2% or 3%. As an example, the proportion of CaO in the magnesia, with respect to the total weight of the magnesia, may be at most 10% by weight including, for example, at most 9%, 8%, 7%, 6%, 5% or 4%.

The fraction by weight of $SiO_2$ in the magnesia may, for example, be at least 0.1% by weight, with respect to the total weight of the magnesia including, for example, at least 0.2%, 0.3%, 0.4%, 0.5%, 0.6% or 0.7%. As an example, the fraction by weight of SiO2 in the magnesia, with respect to the total weight of magnesia, may be at most 3% by weight including, for example, at most 2.5%, 2.3%, 2%, 1.8% or 1.5%. If, again, a plurality of different magnesias are to be used, the aforementioned fractions by weight of CaO and $SiO_2$ also hold for the total weight of the various magnesias.

The component or components in the form of at least one plasticizer may be one or more different plasticizers. As discussed above, a plasticizer is a substance by means of which the brittleness of refractory products based on magnesia can be reduced, or its flexibility can be increased. Appropriate substances are known in the art, in particular in the form of minerals or components from the spinel group.

In accordance with the invention, the at least one plasticizer may comprise at least one of the following components: one or more minerals from the spinel group, aluminium oxide or aluminium oxide-containing raw materials.

Examples of plasticizers in the form of aluminium oxide or aluminium oxide-containing raw materials may be at least one of the following components: corundum, mullite, andalusite, silimanite or kyanite.

In a preferred embodiment, the plasticizer or plasticizers are exclusively in the form of components from the spinel group, particularly preferably exclusively in the form of one or more of the following components: spinel, hercynite, galaxite or jacobsite.

The plasticizer or plasticizers, in particular if they are in the form of spinel, hercynite, galaxite or jacobsite, may be present in the batch in proportions in the range 2% to 30%.

A plasticizer in the form of spinel is a true spinel, i.e. magnesia spinel ($MgO.Al_2O_3$, $MgAl_2O_4$). As an example, the spinel may be present in the batch in fractions by weight in the range 1% to 20% by weight including, for example, in proportions of at least 1%, 2%, 3%, 4%, 5%, 6%, 7%, 8% or 9%. Furthermore, the spinel may, for example, be present in the batch in fractions by weight of at most 20% including, for example, in proportions of at most 19%, 18%, 17%, 16%, 15%, 14%, 13%, 12% or 11%.

When hercynite is present as a component in the batch of the invention in the form of a plasticizer, it is a ferro-spinel ($FeO.Al_2O_3$, $FeAl_2O_4$).

When jacobsite is present as a component in the batch of the invention in the form of a plasticizer, it is a ferro-spinel $(Mn^{2+}, Fe^{2+}, Mg)(Fe^{3+}, Mn_{3+})_2O_4$.

Galaxite, which also may be present as a component in the batch of the invention in the form of a plasticizer, is a mangan-spinel ($MnO.Al_2O_3$, $MnAl_2O_4$).

As an example, hercynite, galaxite and jacobsite may be present in respective fractions by weight in the range 1% to 10%, with respect to the total weight of the batch. Thus, these substances may, for example, be present in the batch in respective fractions by weight of at least 1%, 2%, 3%, 3.5%, 4% or 4.5%. As an example, these substances may be present in the batch in respective fractions by weight of at most 10% including, for example, in respective fractions by weight of at most 9%, 8%, 7%, 6.5%, 6% or 5.5%.

Preferably, the total weight of hercynite, galaxite and jacobsite in the batch is in the range 1% to 15%, particularly preferably in the range 1% to 10%.

In accordance with a particularly preferred embodiment, the batch exclusively comprises plasticizers in the form of spinel and hercynite.

The batch of the invention preferably comprises magnesia (MgO) as the component with the highest fraction by weight of all of the components in the batch. Preferably, furthermore, plasticizers in the form of spinel may be present in the batch as the component with the second highest fraction by weight—i.e. with a fraction by weight which is smaller than that of the magnesia component but higher than that of the plasticizer in the form of hercynite, galaxite or jacobsite— and plasticizers in the form of hercynite, galaxite or jacobsite (total weight thereof)—with the third highest fraction by weight.

The components of the batch of the invention, in particular magnesia and plasticizers, may have a granulometry of at most 10 mm in the batch, particularly preferably with a granulometry of at most 9 mm, 8 mm, 7 mm, 6 mm or 5 mm.

As an example, the magnesia component may have the following fractions by weight in the following granulometry ranges, respectively with respect to the total weight of magnesia in the batch:

>3 mm to 10 mm or >3 mm to 5 mm: 6% to 13%,
>1 mm to 3 mm: 20% to 35%,
>0 mm to 1 mm: 40% to 80%, in particular 50% to 70%.

In accordance with one embodiment, in addition to the components magnesia, plasticizer and a phosphorus-comprising component, the batch does not comprise any or only a small proportion of further components since, as discussed above, the batch might react sensitively to other components. In accordance with one embodiment, in addition to the components magnesia, plasticizer and a phosphorus-comprising component, the batch may contain further components in a fraction by weight of less than 10% including, for example, less than 8%, 6%, 5%, 4%, 3%, 2% or less than 1%, respectively with respect to the total weight of the batch.

As an example, as a further component, the batch may comprise a $SiO_2$-comprising component, for example quartz or another $SiO_2$ carrier, to adjust the ratio of the mole fractions of CaO to $SiO_2$ in the batch. As an example, such a $SiO_2$-comprising component may be present in the batch in fractions by weight of up to 3% including, for example, in fractions by weight of up to 2% or up to 1%.

As a further example, the following further components may be present in the batch in the maximum fractions by weight given below, respectively with respect to the total weight of the batch:

$Al_2O_3$, but not as spinel or in the form of $MgO.Al_2O_3$: maximum 5%, 4%, 3%, 2%, 1%, 0.5%,
$Cr_2O_3$: maximum 3%, 2%, 1%, 0.5%,
$TiO_2$: maximum 3%, 2%, 1%, 0.5%,
$ZrO_2$: maximum 3%, 2%, 1%, 0.5%,
MnO: maximum 3%, 2%, 1%, 0.5%,
C: maximum 3%, 2%, 1%, 0.5%,
$B_2O_3$: maximum 1%, 0.5%,
$Na_2O$: maximum 1%, 0.5%,
$K_2O$: maximum 1%, 0.5%.

Reference made herein to the "total weight of the batch" means the total weight of the unblended batch, i.e. the batch of the invention which has not been blended with a binder.

A further object of the invention is a shaped refractory ceramic product which is preferably produced from the batch of the invention by means of ceramic firing.

The shaped refractory ceramic product of the invention may in particular be a shaped refractory ceramic product in the form of a refractory brick.

In order to produce a shaped refractory ceramic product from the batch of the invention, the skilled person may resort to known prior art methods for the manufacture of products of this type from batches of the same type, since a shaped refractory ceramic product from the batch in accordance with the invention—despite the phosphorus-comprising component—can be produced in the same manner as batches of the same type without such a phosphorus-comprising component.

The skilled person may resort to known methods and technologies from the prior art for the production of a shaped refractory ceramic product from the batch in accordance with the invention.

As an example, for the production of a shaped refractory ceramic product (hereinafter also termed a "refractory brick") from the batch of the invention, a batch in accordance with the invention may initially be provided.

The batch of the invention may be mixed to produce a homogeneous blend, for example using a suitable mixing device. As an example, mixing of the components may constitute the first time that at least part of the batch is produced.

A binder may be added to the batch, in particular during mixing, for example. In this regard, in principle any known binder from the prior art which is suitable for batches of the same type may be used, in particular, for example, organic binders, for example a fruit acid, for example citric acid.

Binders in fractions by weight in the range 3% to 10% by weight, taking the weight of the batch as 100%, may be added to the batch, for example.

The batch blended with a binder may be shaped into a green body using technology which is known in the art, in particular by compression.

Next, after optional drying in a drying unit, the green body may be fired by ceramic firing to form a refractory brick.

Ceramic firing is carried out at temperatures at which the components of the batch are sintered together and thus form a shaped refractory ceramic product. As an example, the batch may be fired at temperatures in the range from at least 1,450° C. or at least 1,500° C. and at temperatures of at most 1,600° C. or at most 1,560° C.

After ceramic firing, a shaped refractory ceramic product is obtained. The shaped refractory ceramic product of the invention may in particular have a $T_0$ value of more than 1,325° C., i.e. a value for the softening behaviour under pressure (refractoriness under load), $T_0$, of more than 1,325° C. The value for the refractoriness under load may in particular be determined in accordance with DIN EN ISO 1893: 2008-09.

In particular, the product of the invention may also have such a $T_0$ value of more than 1,350° C., 1,380° C., 1,400° C., 1,420° C. or even over 1,440° C. The $T_{0.5}$ value for the refractoriness under load, which in particular may also be determined in accordance with DIN EN ISO 1893: 2008-09, may be over 1,500° C., 1,530° C., 1,550° C., 1,570° C., 1,590° C. or even over 1,600° C., for example.

The shaped refractory ceramic product of the invention also has a microstructural elasticity which is sufficient for its purpose; this can be characterized by at least one of the following typical properties:

modulus of elasticity: <70 GPa, <60 GPa, <50 GPa or 40 GPa nominal notched-bar tensile strength: <10 MPa, <9 MPa, <8 MPa or <7 MPa.

The modulus of elasticity (E modulus) may be determined at room temperature using the details in the following reference: G Robben, B Bollen, A Brebels, J van Humbeeck, O van der Biest: "Impulse excitation apparatus to measure resonant frequencies, elastic module and internal friction at room and high temperature", Review of Scientific Instruments, Vol 68, pp 4511-4515 (1997).

The nominal notched-bar tensile strength may be determined at 1,100° C. using the details in the following reference: Harmuth H, Manhart Ch, Auer Th, Gruber D: "Fracture Mechanical Characterisation of Refractories and Application for Assessment and Simulation of the Thermal Shock Behaviour", CFI Ceramic Forum International, vol 84, No 9, pp E80-E86 (2007).

In particular, the product of the invention comprises the following mineral phases:

magnesia,
at least one mineral phase which has been formed from at least one plasticizer, as well as
at least one of the following phases: tricalcium phosphate or a calcium-silicate-phosphate solid solution.

In addition, the product of the invention may comprise at least one of the following phases: ferrite or dicalcium silicate.

The fractions by weight of the mineral phases in the product of the invention which have been formed from the plasticizer or plasticizers may correspond to the fractions by weight in the batch of the invention. When the plasticizers are present in the batch in the form of minerals from the spinel group, these are usually present as the corresponding mineral phase in the product produced therefrom, since as a rule, these undergo practically no transformation during ceramic firing. In this regard, for example, plasticizers in the form of spinel, hercynite, galaxite or jacobsite are present in the fired product as the corresponding mineral phases.

The fraction by weight of dicalcium silicate in the product, with respect to the total weight of the product, may, for example, be in the range 0.5% to 8% by weight including, for example, at least 0.5%, 0.8%, 1% or 1.5% and at most 8%, 7%, 6%, 5%, 4%, 3% or 2.5%.

The fraction by weight of tricalcium phosphate in the product, with respect to the total weight of the product, may, for example, be in the range 0.5% to 6% by weight, for example at least 0.5%, 0.8%, 1% or 1.2%, and at most 6%, 5%, 4%, 3%, 2.5% or 2%.

The fraction by weight of calcium-silicate-phosphate solid solution in the product, with respect to the total weight of the product, may, for example, be in the range 0.5% to 8% by weight, for example at least 0.5%, 0.8%, 1% or 1.5%, and at most 8%, 7%, 6%, 5%, 4%, 3% or 2.5%.

The fractions by weight of the magnesia phase in the product of the invention may possibly be slightly under the fractions by weight of magnesia in the batch, since proportions of CaO and $SiO_2$ from the magnesia batch component might have reacted together as well as with the phosphorus of the phosphorus-comprising component during ceramic firing of the batch, and thus in particular might have formed the mineral phases from CaO, $SiO_2$ and phosphate described above. Furthermore, iron oxide constituents of the magnesia might have formed ferrite. As an example, the fraction by weight of the magnesia phase in the product of the invention may thus be in the range 1.5% to 10%, i.e., for example 3% below the fractions by weight of magnesia in the batch described above. As an example, magnesia in the product may be present in the batch in fractions by weight in the range 68% to 94% with respect to the total weight of the product including, for example, in proportions of at least 68%, 70%, 72%, 74%, 76%, 78%, 80%, 81% or 82% and, for example, at most 94%, 92%, 90% or 88%.

Ferrite may be present in the product in fractions by weight, for example, with respect to the total weight of the product, in the range 1% to 6%, for example in proportions of at least 1%, 1.2% or 1.5% and, for example, in proportions of at most 6%, 5%, 4%, 3% or 2.5%.

The shaped refractory ceramic product of the invention may in particular be used where shaped refractory ceramic products with a high microstructural elasticity have to be used. Preferably, the product of the invention can, for example, be used in cement industry kilns (in particular in rotary kilns), in the glass industry (in particular for use as a checker brick in regenerators), in steelmaking (in particular, for example for use in a ladle or as an outer lining) or, for example, in the non-ferrous industry (for example for use in electric furnaces for nickel-copper alloys).

All of the features of the invention disclosed here may be combined with each other in any manner, individually or in combination.

An exemplary embodiment of a composition for a magnesia will now be provided; it can be used in a batch in accordance with the invention. The magnesia component is composed of two different sintered magnesias, hereinafter referred to as "magnesia 1" and "magnesia 2". The different magnesias each have the following fractions by weight of major oxide constituents as well as minor constituents, respectively with respect to the total weight of the respective magnesia:

TABLE 1

| Constituent | Magnesia 1 proportion [%] | Magnesia 2 proportion [%] |
| --- | --- | --- |
| MgO | 90.2 | 97.0 |
| CaO | 2.3 | 1.9 |
| $SiO_2$ | 0.8 | 0.8 |

TABLE 1-continued

| Constituent | Magnesia 1 proportion [%] | Magnesia 2 proportion [%] |
| --- | --- | --- |
| $Fe_2O_3$ | 6.0 | 0.1 |
| $Al_2O_3$ | 0.4 | 0.0 |
| Minor constituents | 0.3 | 0.2 |

In an exemplary embodiment, a batch in accordance with the invention had the following components in the following fractions by weight, respectively with respect to the total weight of the batch:

TABLE 2

| Component | Proportion [%] |
| --- | --- |
| Magnesia 1 | 70.0 |
| Magnesia 2 | 14.43 |
| Spinel (plasticizer) | 10 |
| Hercynite (plasticizer) | 5 |
| Phosphate-comprising component | 0.57 |

The magnesia used corresponds to the magnesia of Table 1.

The magnesia, spinel and hercynite components have respective granulometries in the range >0 to 5 mm.

The phosphate-comprising component is aluminium metaphosphate. The actual proportion of phosphorus in the batch was 0.44% by weight, with respect to $P_2O_5$.

Thus, the batch of Table 2 had a molar ratio of CaO to $SiO_2$ of 3.1.

In accordance with formula (I) above, 0.6% by weight of free CaO was present in the batch. The ideal proportion of phosphorus in the batch, calculated as $P_2O_5$ in accordance with formula (II), was thus 0.5% by weight, whereupon the actual proportion of phosphorus was thus only 0.06% below the ideal proportion and thus only 13.6% below the value for the ideal proportion, with respect to the ideal value.

In accordance with an exemplary embodiment of a method for the manufacture of a shaped refractory ceramic product from the batch of Table 2, this batch was initially mixed in a mixer. At the same time, binder in the form of 6% citric acid was added in an amount of 2% by weight, with the weight of the batch being set at 100%. After mixing, the batch was formed into a green body by compression and then dried in a dryer at 95° C. Finally, after drying, the green body was fired at 1,530° C. to form a ceramic product.

The product obtained thereby had a refractoriness under load temperature, $T_0$, of 1,444° C., and a $T_{0.5}$ of 1,649° C. and was used as a rotary kiln brick.

In the accompanying drawings.

In FIGS. 1 to 5, the white bars in the lower centre of the image each correspond to a length of 10 μm.

Figure 1:
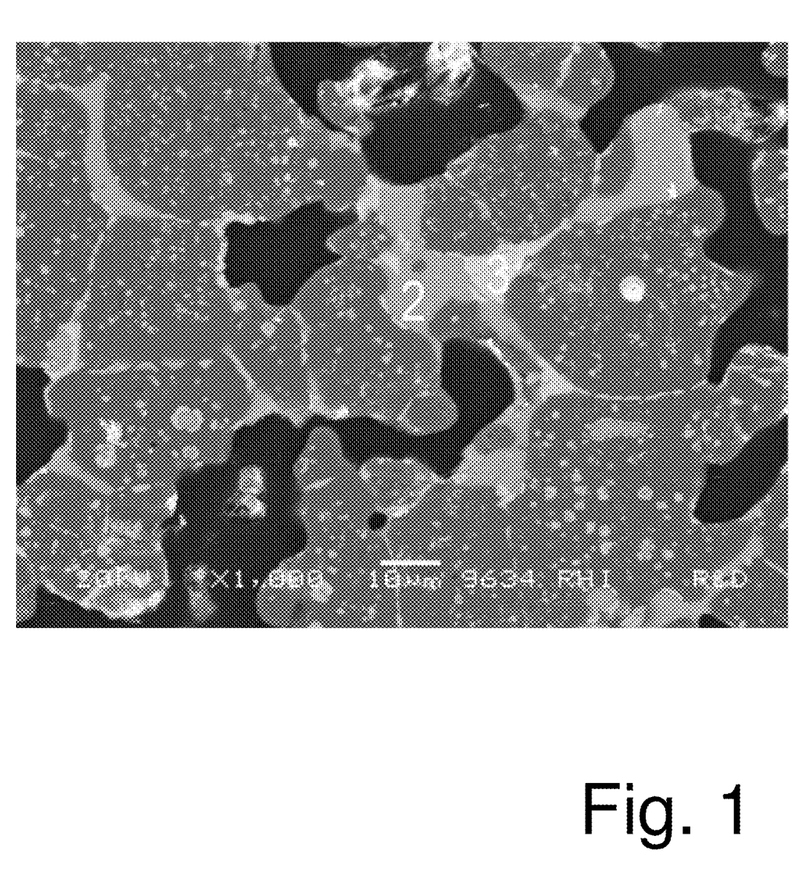
FIG. 1 shows a scanning electron microscope image of a section of a refractory brick from the prior art.
Figure 2:
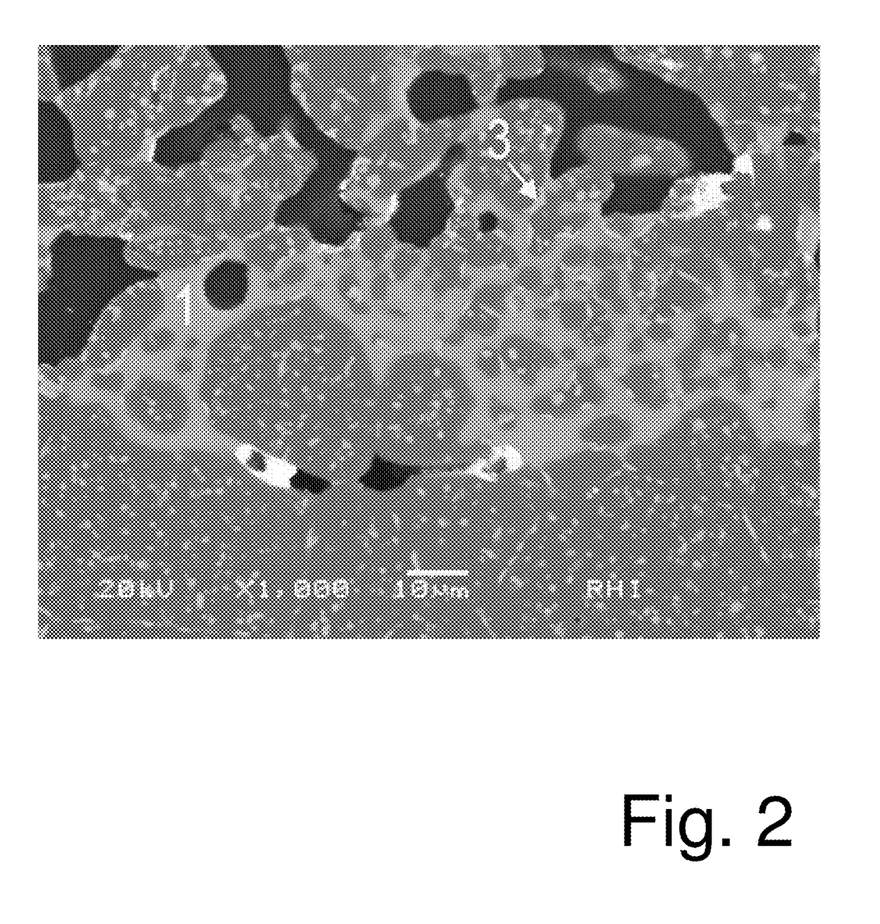
FIGS. 2 to 5 show scanning electron microscope images of sections of products in accordance with the invention.
Figure 3:
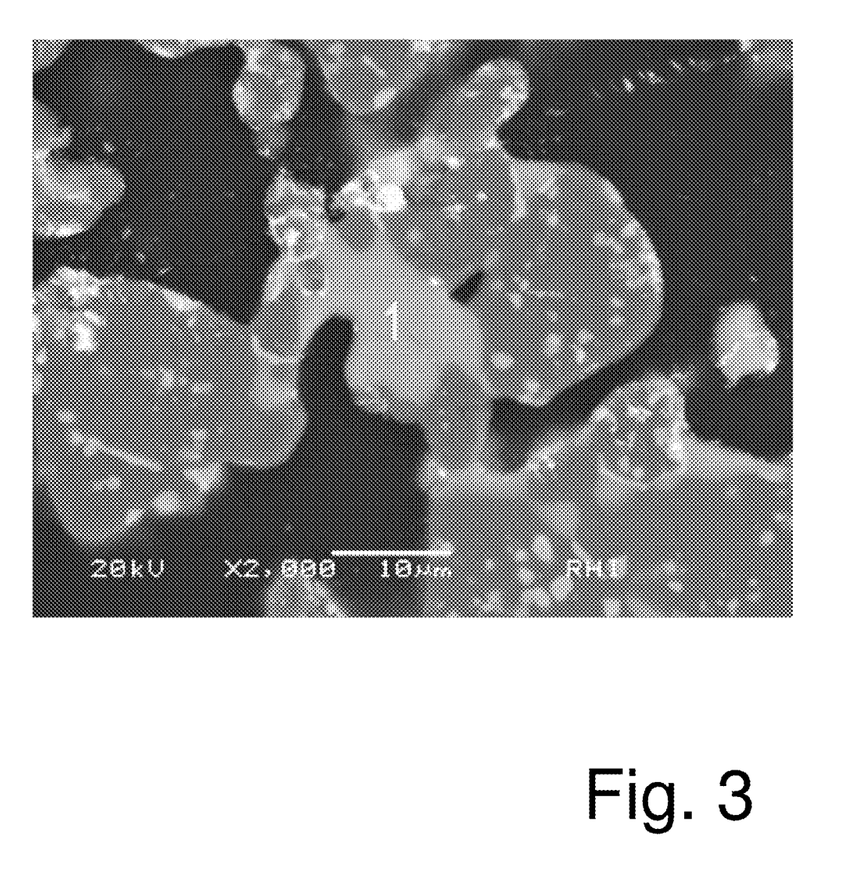
Figure 4:
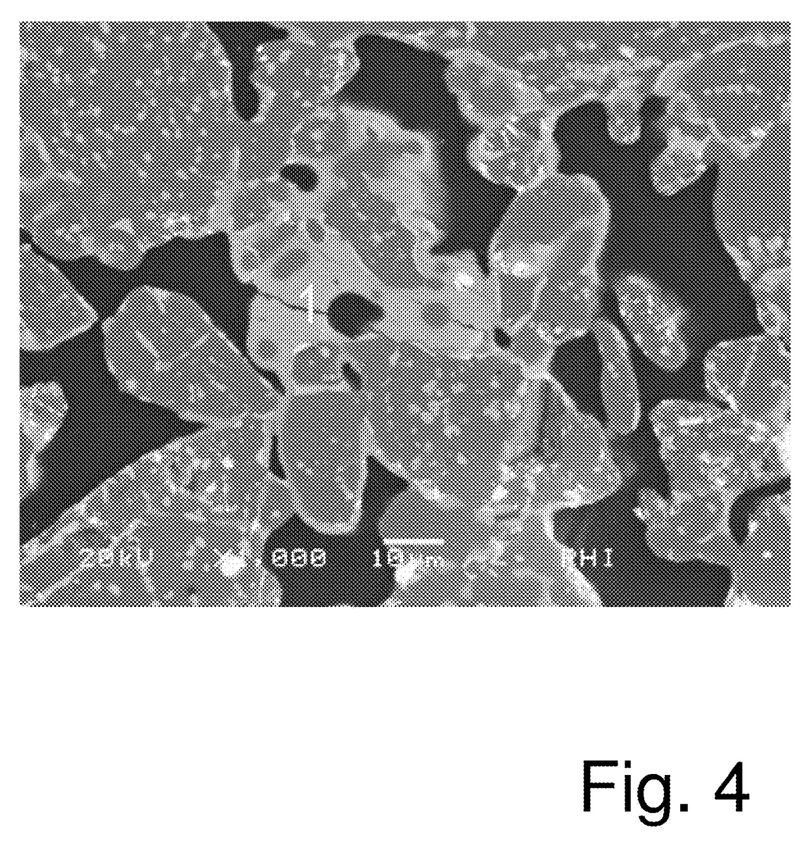
Figure 5:
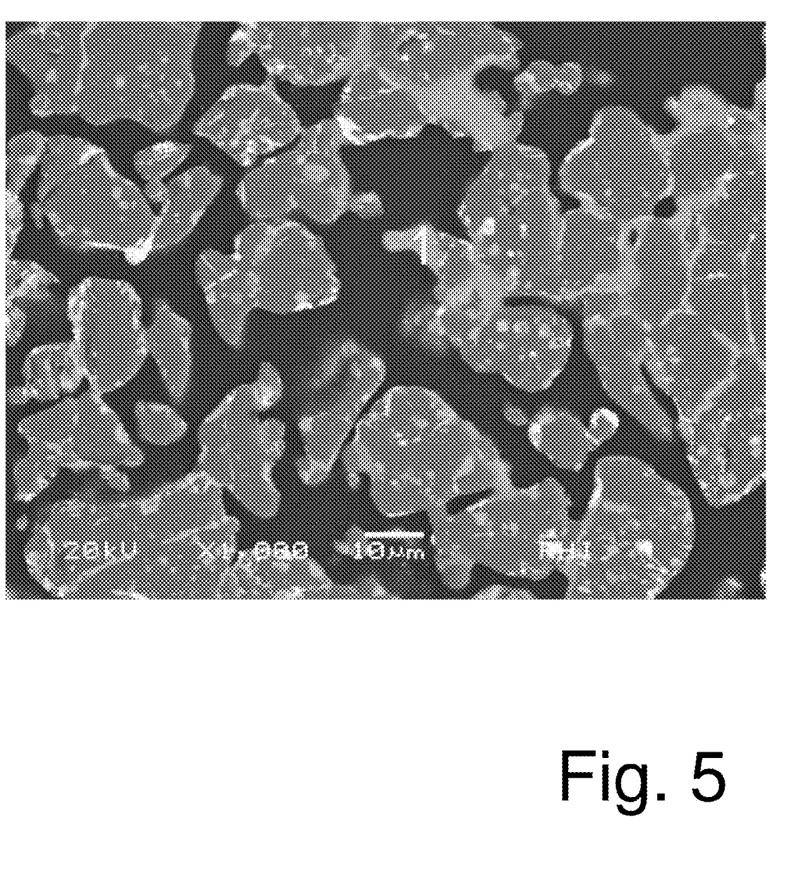

The section of the refractory brick of FIG. 1 is formed from a batch which comprises the components magnesia, spinel and hercynite. In FIG. 1, the dicalcium silicate phase 2 and ferrite phase 3 can be seen.

The products of FIGS. 2 to 5, based on a batch which additionally comprises a phosphorus-comprising component, are in contrast to the refractory brick of FIG. 1. In this regard, in addition to the magnesia, spinel, hercynite, dicalcium silicate 2 and ferrite 3 phases, the bricks of FIGS. 2 to exhibit a further phase with reference numeral 1, of a calcium-silicate-phosphate solid solution.

The invention claimed is:

1. A refractory ceramic batch based on magnesia, having the following characteristics:
   1 the batch comprising:
   1.1.1 at least 70% by weight of magnesia,
   1.1.2 at least one plasticizer
      wherein the at least one plasticizer comprises at least one of magnesia spinel, hercynite, galaxite or jacobsite, as well as
   1.1.3 at least one phosphorus-comprising component;
   1.2 wherein the batch comprises proportions of CaO and SiO$_2$
      wherein the mole fraction of CaO in the batch is more than twice the mole fraction of SiO$_2$ in the batch.

2. The batch as claimed in claim 1, in which the proportion by weight of phosphorus in the batch, calculated as P$_2$O$_5$, is at most 50% above or below the value for the fraction by weight of P$_2$O$_5$, calculated in accordance with the following formula (I):

$$P_2O_{5\,ideal}\;[\text{weight \%}] = (CaO_{free}) \cdot \frac{b}{a} \qquad (I)$$

wherein said percentage of at most 50% is with respect to said value and wherein CaO$_{free}$ is the quantity of free CaO in the batch as a weight %, which is determined using the following formula:

$$CaO_{free} = x - \frac{2 \cdot y \cdot c}{s} \qquad (II)$$

with
x=proportion of CaO in batch [weight %]
y=SiO$_2$ content in batch [weight %]
c=molecular weight of CaO [g/mol]=56 g/mol
s=molecular weight of SiO$_2$ [g/mol]=60.1 g/mol
a=fraction of CaO in tricalcium phosphate [weight %]=54.2%, and
b=fraction of P$_2$O$_5$ in tricalcium phosphate [weight %]=45.8%.

3. The batch as claimed in claim 1, in which the phosphorus comprising component is present in such fractions by weight in the batch that phosphorus, calculated as P$_2$O$_5$, is present in the batch in the range from 0.1% to 5%, with respect to the total weight of the batch.

4. The batch as claimed in claim 2, in which the fraction by weight of CaO is in the range 0.2% to 8% by weight with respect to the total weight of the batch.

5. The batch as claimed in claim 2, in which the fraction by weight of SiO$_2$ is in the range 0.05% to 3% by weight with respect to the total weight of the batch.

6. The batch as claimed in claim 1, in which the fraction by weight of Fe$_2$O$_3$ which is not present in the batch in the form of a plasticizer is more than 3% by weight with respect to the total weight of the batch.

7. The batch as claimed in claim 1, in which the fraction by weight of magnesia is in the range 70% to 97% by weight with respect to the total weight of the batch.

8. The batch as claimed in claim 1, in which the fraction by weight of plasticizer is in the range 2% to 30% by weight with respect to the total weight of the batch.

9. A shaped refractory ceramic product which is produced from a batch as claimed in claim 1 by ceramic firing and which comprises the following phases:
   magnesia,
   at least one mineral phase which has been formed from at least one plasticizer, as well as
   at least one of the following phases: tricalcium phosphate or a calcium-silicate-phosphate solid solution.

10. The product as claimed in claim 9, in which the fraction by weight of tricalcium phosphate is in the range 0.5% to 6% by weight with respect to the total weight of the product.

11. The product as claimed in claim 9, in which the fraction by weight of calcium-silicate-phosphate solid solution is in the range 0.5% to 8% by weight with respect to the total weight of the product.

12. The product as claimed in claim 9, having a T$_0$ value of more than 1,325° C.

13. The product as claimed in claim 9, having at least one of the following properties:
   modulus of elasticity: <70 GPa, <60 GPa, <50 GPa or <40 GPa,
   nominal notched-bar tensile strength: <10 MPa, <9 MPa, <8 MPa or <7 MPa.

14. The batch as claimed in claim 2, in which the phosphorus comprising component is present in such fractions by weight in the batch that phosphorus, calculated as P$_2$O$_5$, is present in the batch in the range from 0.1% to 5%, with respect to the total weight of the batch.

15. The batch as claimed in claim 1, in which the fraction by weight of CaO is in the range 0.2% to 8% by weight with respect to the total weight of the batch.

16. The batch as claimed in claim 1, in which the fraction by weight of SiO$_2$ is in the range 0.05% to 3% by weight with respect to the total weight of the batch.

17. The batch as claimed in claim 2, in which the fraction by weight of Fe$_2$O$_3$ which is not present in the batch in the form of a plasticizer is more than 3% by weight with respect to the total weight of the batch.

18. The batch as claimed in claim 2, in which the fraction by weight of magnesia is in the range 70% to 97% by weight with respect to the total weight of the batch.

19. The batch as claimed in claim 2, in which the fraction by weight of plasticizer is in the range 2% to 30% by weight with respect to the total weight of the batch.

20. A shaped refractory ceramic product which is produced from a batch as claimed in claim 2 by ceramic firing and which comprises the following phases:
   magnesia,
   at least one mineral phase which has been formed from at least one plasticizer, as well as
   at least one of the following phases: tricalcium phosphate or a calcium-silicate-phosphate solid solution.

* * * * *